(12) United States Patent
Sakuramoto et al.

(10) Patent No.: US 6,567,136 B1
(45) Date of Patent: May 20, 2003

(54) LIQUID CRYSTAL DISPLAY DEVICE

(75) Inventors: Tamaki Sakuramoto, Tokyo (JP); Hiroshi Okumura, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/461,001

(22) Filed: Dec. 14, 1999

(30) Foreign Application Priority Data

Dec. 14, 1998 (JP) ............................................. 10-354845

(51) Int. Cl.⁷ ............................................. G02F 1/1368
(52) U.S. Cl. ........................... 349/43; 349/110; 349/111
(58) Field of Search ............................. 349/42, 43, 44, 349/110, 111; 257/59, 72

(56) References Cited

U.S. PATENT DOCUMENTS

| | | | |
|---|---|---|---|
| 4,477,310 A | 10/1984 | Park et al. | |
| 6,297,862 B1 | * 10/2001 | Murade | ........................ 349/44 |
| 6,330,044 B1 | * 12/2001 | Murade | ........................ 349/44 |
| 6,433,841 B1 | * 8/2002 | Murade et al. | ............... 349/43 |

FOREIGN PATENT DOCUMENTS

| | | |
|---|---|---|
| JP | 5-21399 | 1/1993 |
| JP | 7-64111 | 3/1995 |
| JP | 7-84247 | 3/1995 |
| JP | 8-171101 | 7/1996 |
| JP | 9-258200 | 10/1997 |
| JP | 9-263974 | 10/1997 |
| WO | WO98/16868 | 4/1998 |

\* cited by examiner

*Primary Examiner*—Robert H. Kim
*Assistant Examiner*—Tai Duong
(74) *Attorney, Agent, or Firm*—Choate, Hall & Stewart

(57) ABSTRACT

A liquid crystal display device having, on a transparent insulating substrate, a first light-shielding film, a first interlayer film, a thin film transistor, a second interlayer film and a second light-shielding film, in this order; wherein said first light-shielding film is, with a taper-shaped end, in the form of trapezoid, in which the upper side on the side of the thin film transistor is shorter than the lower side on the side of the substrate, and an angle $\theta_1$ made between the line connecting an end point of the lower side and an end point of a channel in the thin film transistor and the direction normal at the end point of the channel is equal to or more than 50°; and, in addition, an angle $\theta_2$ made between the line connecting an end point of the lower face of the second light-shielding film and a taper starting point of the upper side of the first light-shielding film and the direction normal at the end point of the lower face of the second light-shielding film is equal to or more than 30°.

12 Claims, 4 Drawing Sheets

Prior Art

LIQUID CRYSTAL DISPLAY DEVICE

BACKGROUND OF THE INVENTION

1. Field of the Invention

The present invention relates to a liquid crystal display (LCD) device such as a liquid crystal projector and more particularly to improvements in light-shielding capability of an active matrix type liquid crystal display (LCD) device for a light valve wherein switching of a liquid crystal is carried out through thin film transistors (TFTs).

2. Description of the Related Art

In recent years, as a display for the wall-hanging type television, the projective-type television or the OA appliances, various display units using a liquid crystal panel have been being developed. Among those liquid crystal panels, an active matrix type LCD wherein TFTs are included as the active element in a LCD device is the most promising to realize a high quality display unit for the OA appliances as well as a display unit for the high definition television because of its advantageous natures such as the one that an increase in number of scanning lines therein does not result in a deterioration of the contrast or the response time thereof. Especially when applied to a projection type LCD with the liquid crystal projection or the like, it allows achieving a large screen display with ease.

Normally, in the active matrix type LCD device for a light valve that is utilized for the liquid crystal projection, a small element is illuminated with a strong light, and the light passing therethrough is controlled according to the image data by turning on and off each pixel separately through switching of a liquid crystal by a corresponding TFT, and then the transmitted light, being magnified by an optical element such as a lens, is projected on a screen or the like. At this, if an active layer of the TFT is formed from polysilicon (p-Si), there arises a problem of the leakage current in a channel section of the TFT at the off-time that may be produced, due to the photo-excitation, by the reflected light from the optical system such as a lens, let alone under the influence of the incident light thereon.

The conventional active matrix type LCD device for a light valve of this sort has a first light-shielding film set on the TFT substrate and a second light-shielding film set above the TFT. Upon this, when the incident light comes from the side of an opposite substrate facing the TFT over a liquid crystal layer, the second light-shielding film cuts off the incident light and the first light-shielding film, the reflected light from the optical system.

The second light-shielding film is formed, in some cases, on the same substrate as the TFT with an interlayer film inserted therebetween and, in other cases, on the opposite substrate to the TFT with the liquid crystal layer inserted therebetween. In the case that the second light-shielding film is formed on the opposite substrate to the TFT, the second light-shielding film must be made larger than the first light-shielding film to allow 10 μm or so for a shift in the overlay accuracy between two substrates. This brings about a problem that the aperture ratio cannot be made sufficiently large.

As a result, the method in which the second light-shielding film is formed on the identical substrate with the TFT is mainly employed at present. In this instance, it is unnecessary to allow such a large margin as described above since a high alignment accuracy can be obtained by making a good use of a manufacturing process of a semiconductor device. However, this method pays no regard to the positioning relation among these two light-shielding films and the TFT so that measures of shielding the light caused by diffused reflection within the panel are not satisfactory.

FIG. 4(a) is a schematic cross-sectional view of a TFT substrate with a conventional structure. Upon a transparent insulating film 41 of glass, quartz or the like, a first light-shielding film 42 is formed and thereon, over a first interlayer film 43, a p-Si is formed as an active layer for a TFT. In the active layer, a source-drain is formed by dopant implantation and a channel 45 is formed between the source and the drain. This drawing shows a cross-sectional view taken in the direction of the channel width. Consequently, in this setting, the source and the drain are meant to be above and under the plane of the drawing, respectively. On the active layer, a gate electrode 48 is formed via a gate oxide film 47, and thereon a second light-shielding film 50 which normally also serves as a data line is formed onto a second interlayer film 49. Further, onto those, a third interlayer film 51 is formed and then a pixel electrode, a liquid crystal layer and an opposite substrate, none of which is shown in the drawing, are formed and thereby a liquid crystal panel is accomplished.

When the principal direction of the light emission from a light source is arranged perpendicular to a liquid crystal panel, it is considered that almost all the directions of propagation of the light passing through the liquid crystal panel are normally confined in the directions that make angles not exceeding 30° with the direction normal to the surface of the liquid crystal panel. This is disclosed in Paragraph (0065) of Japanese Patent Application Laid-open No. 171101/1996. Therefore, only the light with the direction at an angle up to 30° to the direction normal is concerned herein. Upon this, a conventional structure in which the first light-shielding film 42 is formed to have the same width as the channel width has a problem that a reflected light 61 generated by the reflection of an incident light 60 on the reverse of the substrate or a reflected light 62 from the optical system may enter into the channel.

If, in order to overcome this, the width of the first light-shielding film 42 is extended to almost the same width of the second light-shielding film 50, as shown in FIG. 4(b), the reflected lights 61 and 62 are obstructed by the first light-shielding film and stopped reaching the channel. However, in this case, there arises a new problem that a reflected light 63 generated by the reflection of the incident light 60 on the surface of the first light-shielding film may enter into the channel. Further, to eliminate this problem, an increase in the width of the second light-shielding film 50 is required, which results in a reduction of the aperture ratio.

SUMMARY OF THE INVENTION

An object of the present invention is to provide a liquid crystal display device capable to prevent a reflected light from the reverse of a substrate and a reflected light from an optical system from entering into a channel therein, without lowering aperture ratio thereof.

Accordingly, the present invention is directed to a liquid crystal display device having, on a transparent insulating substrate, a first light-shielding film, a first interlayer film, a thin film transistor, a second interlayer film and a second light-shielding film, in this order; wherein:

said first light-shielding film is, with a taper-shaped end, in the form of trapezoid, in which the upper side on the side of the thin film transistor is shorter than the lower side on the side of the substrate, and an angle made between the line connecting an end point of said lower side and an end point of a channel in the thin film transistor and the direction normal at said end point of the channel is equal to or more than 50°; and, in addition, an angle made between the line connecting an end point of the lower face of said second light-shielding film and a taper starting point of the upper side of said first light-shielding film and the direction normal at said end point of the lower face of the second light-shielding film is equal to or more than 30°.

In the present invention, by defining the positioning relation among the first light-shielding film formed below the TFT, the second light-shielding film formed above the TFT and the channel and making an end section of the first light-shielding film into the form of a taper, the reflected light from an optical system set on the emission side outside of the liquid crystal panel and the reflected light from the reverse of the substrate on which the TFT is formed are certainly obstructed by the first light-shielding film and besides the light travelled behind the second light-shielding film in an oblique way is reflected by a taper face of the first light-shielding film, and thereby the leakage of the light in the channel of the TFT can be suppressed, along with achieving a higher aperture ratio.

DETAILED DESCRIPTION OF THE PREFERRED EMBODIMENTS

Figure 2:
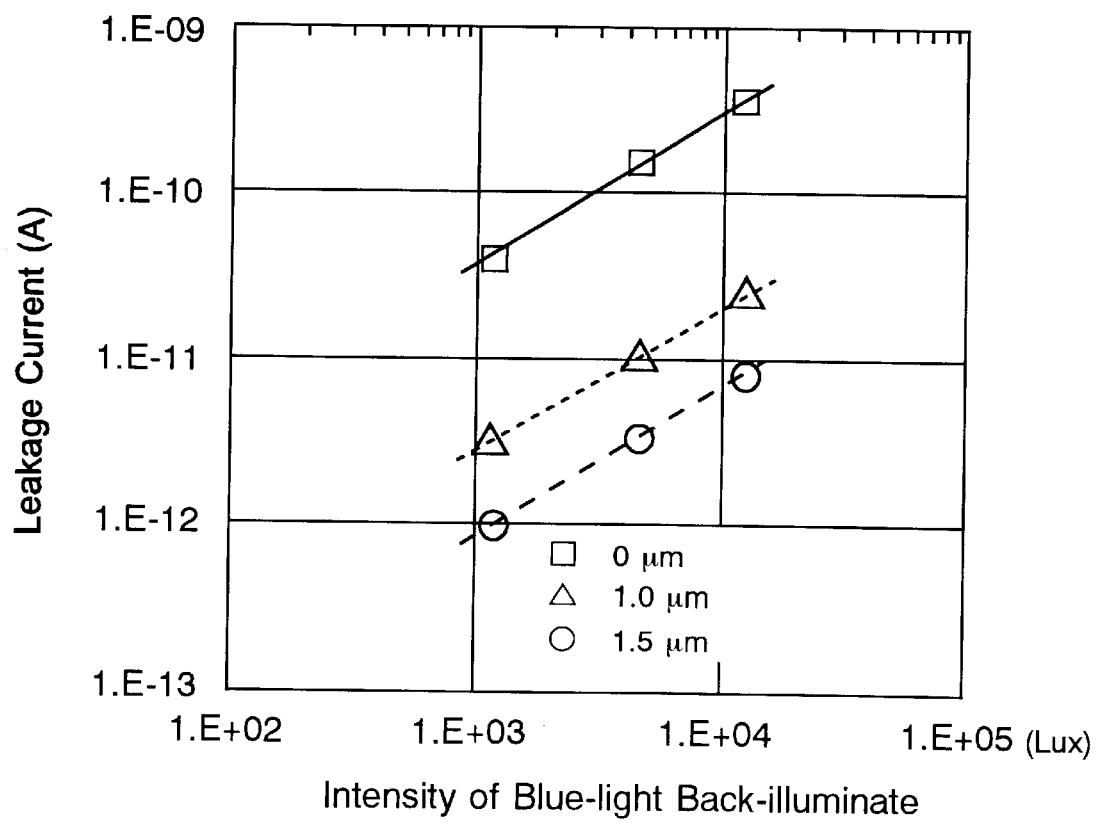
FIG. 2 is graphs of the leakage current versus the intensity of blue-light back-illumination for three samples with respective widths of the first light-shielding film, which illustrates changes of the leakage current depend on the film width of the first light-shielding film.

Under the assumption that the reflected light from the reverse of a substrate is present, the present inventors studied the cases that an illumination of a red, a blue or a green light was applied from the reverse of the substrate and confirmed that the leakage current caused by a blue light is the biggest. The present inventors then examined the relationship between the width of a first light-shielding film formed on the side of a substrate and the amount of the leakage current and observed the relationship shown in FIG. 2. For this, the measurements were carried out without forming, in the end section of the first light-shielding film, a taper that characterizes the present invention. The evaluations were made for a case that the width of the first light-shielding film was set to be the same as the channel width (0 μm) and for cases that the widths of the first light-shielding film are made greater than the TFT channel width by 1.0 μm and 1.5 μm for one side, respectively. As seen in the drawing, when this extension is 1.5 μm or more, the leakage current caused by a blue light can be kept as little as 10 pA or less even at an illumination intensity of 10000 lux, and an excellent TFT characteristic can be obtained. The manufacturing conditions of the samples used for these tests are as follows:

First light-shielding film: tungsten silicide; 110 nm in thickness

First interlayer film: $SiO_2$; 1 μm in thickness

Channel width: 1 μm

The positioning relation between the light-shielding film and the channel was then examined. When the film thickness of the first interlayer film is denoted by a and the distance between an end point of a channel and an end point of the first light-shielding film, by b, as shown in FIG. 1(b), an angle $\theta_1$ made between the line connecting the end point of the channel and the end point of the first light-shielding film and the direction normal at the end point of the channel is given by the following equation (1).

$$\theta_1 = 90 - \tan^{-1}\left(\frac{a}{b}\right) \tag{1}$$

Substituting 1 μm for a and 1.5 μm for b in the above equation, $\theta_1$ becomes approximately 56°. In practice, if $\theta_1$ is 50° or larger, it is possible to keep the leakage current caused by a blue light at 10 pA even at an illumination intensity of 10000 lux. Accordingly, it is considered that, even when the thickness of the first interlayer film is varied, the same effect can be obtained by setting $\theta_1$ to be 50° or larger. As for the maximum, it can be determined from the relationship between the film thickness of the first interlayer film and the acceptable minimum aperture ratio. In the above example, it is preferable to set b to be 3 μm or so.

With respect to the film thickness of the first light-shielding film, if a silicide film such as tungsten silicide as mentioned above is utilized, 100 nm or more is sufficient to provide the light-shielding effect but 160 nm or more is preferable. Further, the film thickness of the first interlayer film is preferably set to be 500 nm or more so as to prevent the first light-shielding film from acting as a back-gate for the TFT. While the maxima for the thicknesses of respective films are not specifically set and can be appropriately chosen according to the design, it is normally preferable that the thickness of the first light-shielding film does not exceed 500 nm or so and that of the first interlayer film, 2 μm or so.

Next, the positioning relation between the first light-shielding film and the second-light-shielding film was examined. As described in the above description of the conventional techniques, when the light is sent forth vertically to a liquid crystal panel from a light source disposed on the side of a liquid crystal layer, almost all the incident light are confined in the directions making an angle of up to 30° with the direction normal to the panel surface. Therefore, it is considered that the problem of leakage caused by the incident light can be eliminated if the second light-shielding film can prevent the incident light to reach the surface of the first light-shielding film. In other words, it is thought that the second light-shielding film should be made in such a way that an angle $\theta_2$ made between the line connecting an end point of the first light-shielding film and an end point of the second light-shielding film and the direction normal at the end point of the second light-shielding film becomes 30° or larger. Now, when the distance between the first light-shielding film and the second light-shielding film is denoted by c and the distance between the end point of the first light-shielding film and the second light-shielding film, by d, the distance d is given by the following equation (2).

$$d = \tan\theta_2 \times c \tag{2}$$

Here, if $\theta_2$ is 30° and the distance c between the first light-shielding film 2 and the second light-shielding film 10 is 2 μm, the distance d is 1.2 μm on calculation.

In the afore-mentioned example, if the distance b is 1.5 $\mu$m, the extra width of the second light-shielding film as against the channel width amounts to 2.7 $\mu$m for one side. Consequently, as described in the above description of the conventional techniques, an extension of the width of the second light-shielding film results in lowering of the aperture ratio.

As against this, the present inventors found a novel technique enabling to keep the extension of the width of the second light-shielding film and, thus, the lowering of the aperture ratio within bounds, wherein the cross-section of the first light-shielding film along the direction of the channel width is made a trapezoid in shape with its upper side (on the TFT side) being shorter than its lower side (on the side of the transparent insulating substrate) and an end section of the first light-shielding film is made a taper in shape.

Figure 1A:
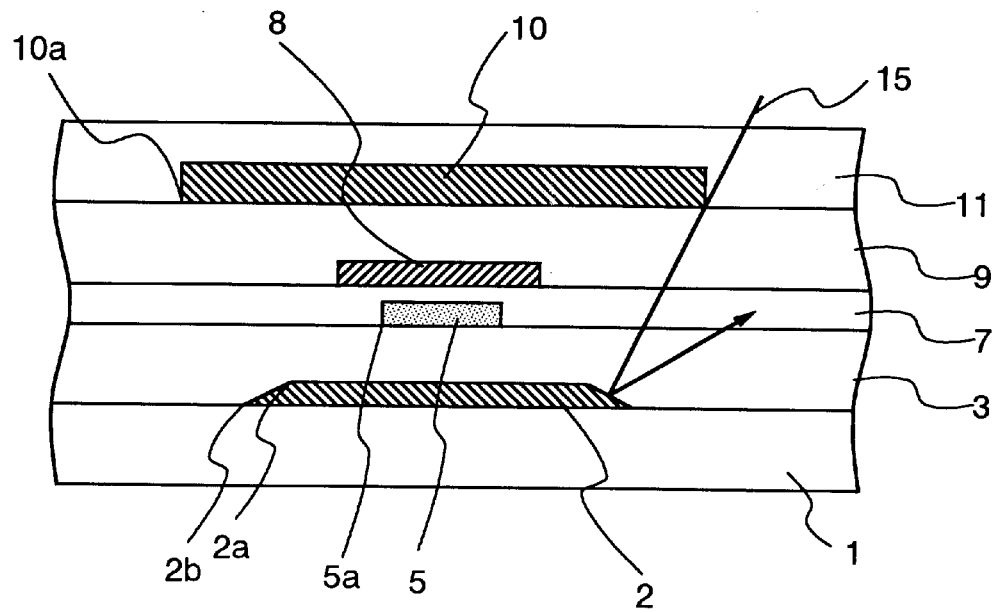
FIG. 1(a) is schematic cross-sectional view in explaining effects of the present invention and FIG. 1(b) is a conceptional view for explaining the relation of the defined positions.
Figure 1B:
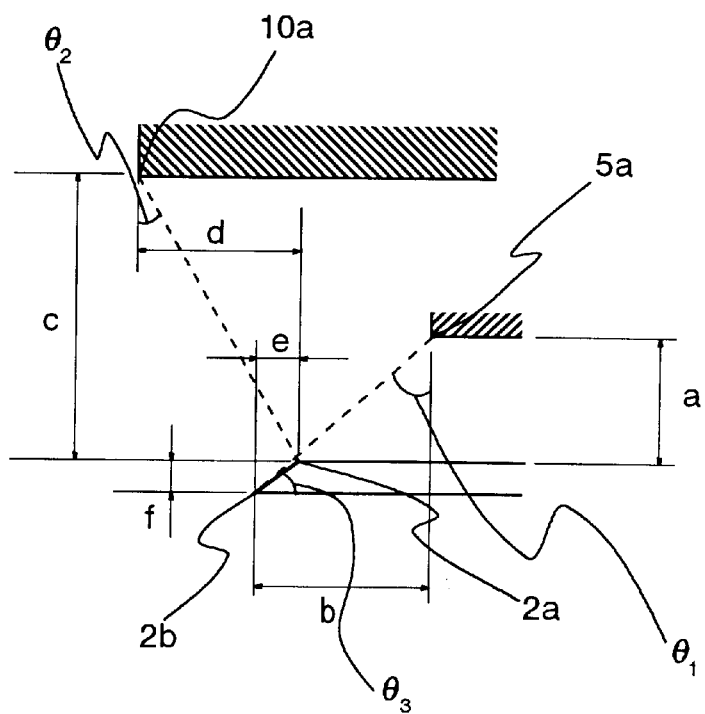

In this geometrical arrangement, as shown in FIG. 1($a$), the incident light 15 travelled behind the edge section of the second light-shielding film 10 in an oblique way is reflected from a taper section of the first light-shielding film 2 towards the outside so that the incidence of the light on the channel 5 can be avoided. Moreover, as shown in FIG. 1($b$), the distanced d is determined on the basis of the starting point 2$a$ of the taper on the upper side of the first light-shielding film 2 so that the width of the second light-shielding film 10 can be shortened by a length of the taper and, therefore, the lowering of the aperture ratio, reduced.

In the present invention, a taper angle $\theta_3$ varies with the film thickness of the first light-shielding film but its setting in a range of 30 to 80° is found to be effective, in general. Preferably it is set to be 30 to 50°. With an angle $\theta_3$ under 30°, the light incident on the taper section cannot be reflected towards outside and besides, a region where the light-shielding film is considerably thin becomes too extensive in the taper section and, in some cases, the light-shielding effect against the reflected light from the underneath of the first light-shielding film may become diminished. On the other hand, with an angle over 80°, the effect owing to the shape of a taper or the effect of reducing the width of the second light-shielding film is hardly recognizable.

Now, when the taper angle $\theta_3$ is 30°, the distance e between an end point of the first light-shielding film and a starting point of the taper 2$a$ can be calculated by the equation (3).

$$e = \frac{f}{\tan\theta_3} \quad (3)$$

Here, f is the film thickness of the first light-shielding film. Substituting 200 nm for the film thickness of the first light-shielding film, the distance e becomes approximately 350 nm. In other words, the width of the second light-shielding film can be reduced by the amount of this distance e.

The above positioning relation among the end point 2$b$ of the lower side of the first light-shielding film 2, the starting point 2$a$ of the taper, the end point 5$a$ of the channel and the end point 10$a$ of the second light-shielding film are summarized in FIG. 1($b$).

Next, referring to an embodiment, the present invention is described in detail below.

Figure 3A:
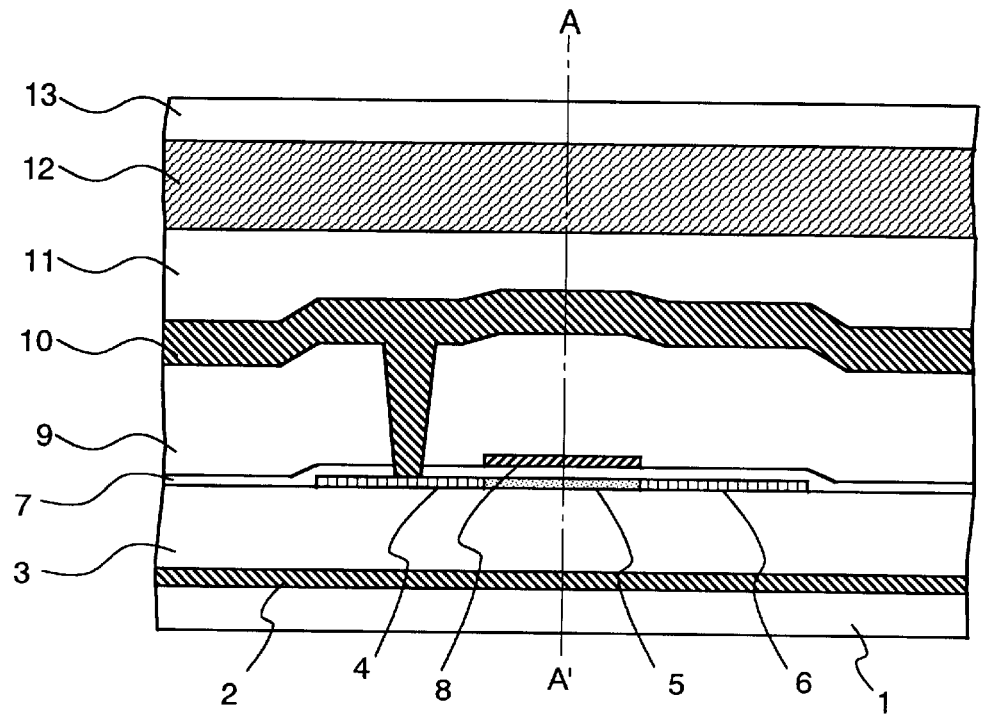
FIG. 3(a) is a cross-sectional view of a LCD device that is one example of the present invention and FIG. 3(b) is a cross-sectional view taken on line A–A' of FIG. 3(a).
Figure 3B:
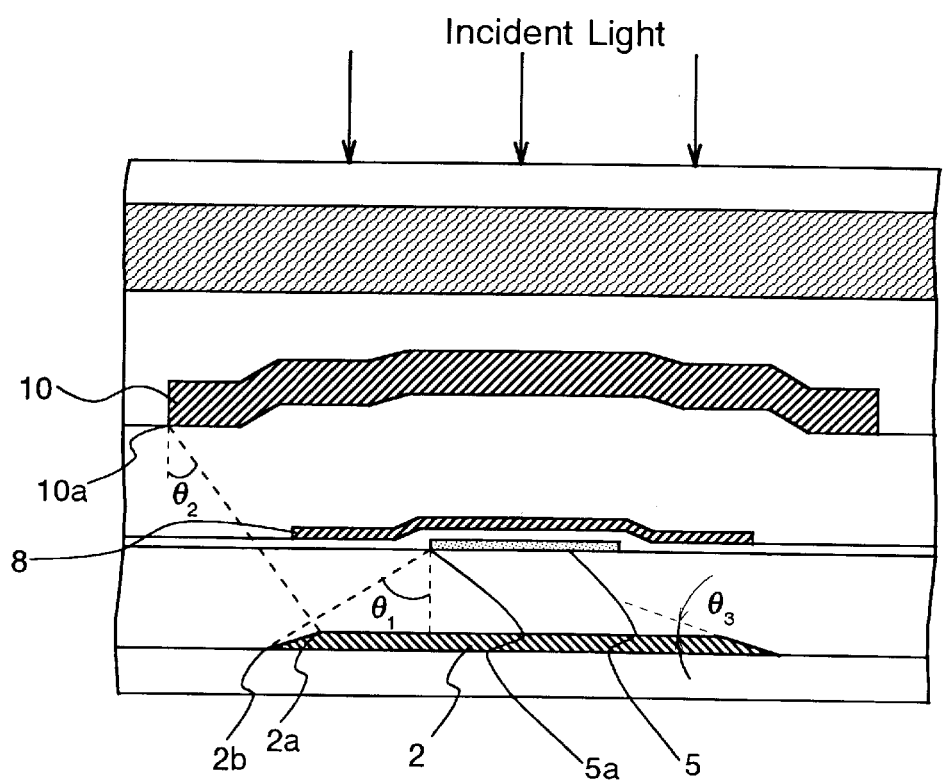
Figure 4A:
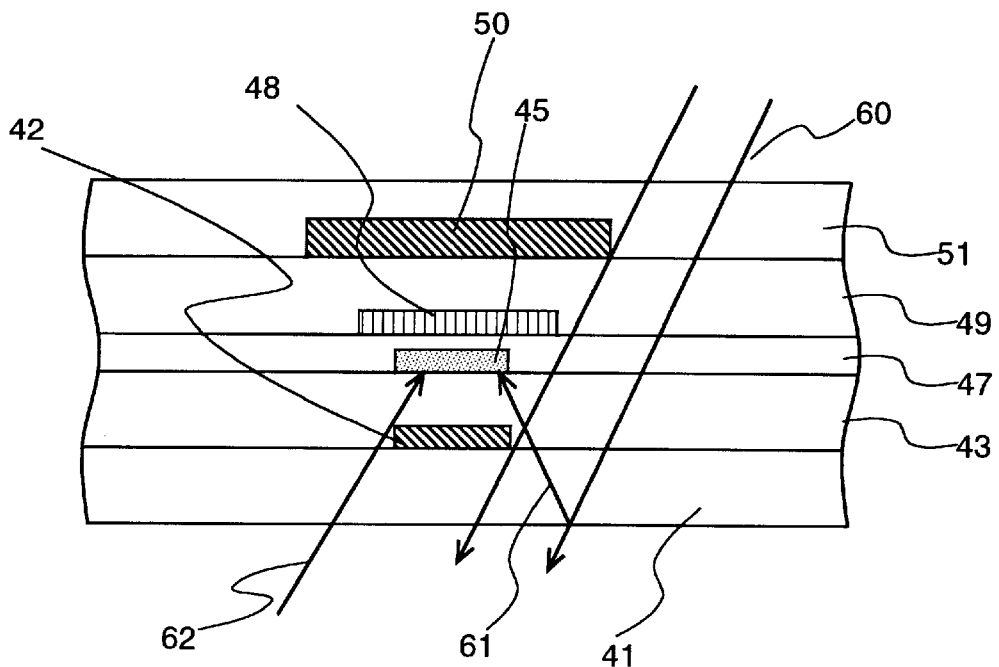
FIGS. 4(a) and 4(b) are schematic cross-sectional views in explaining problems associated with the conventional structures.
Figure 4B:
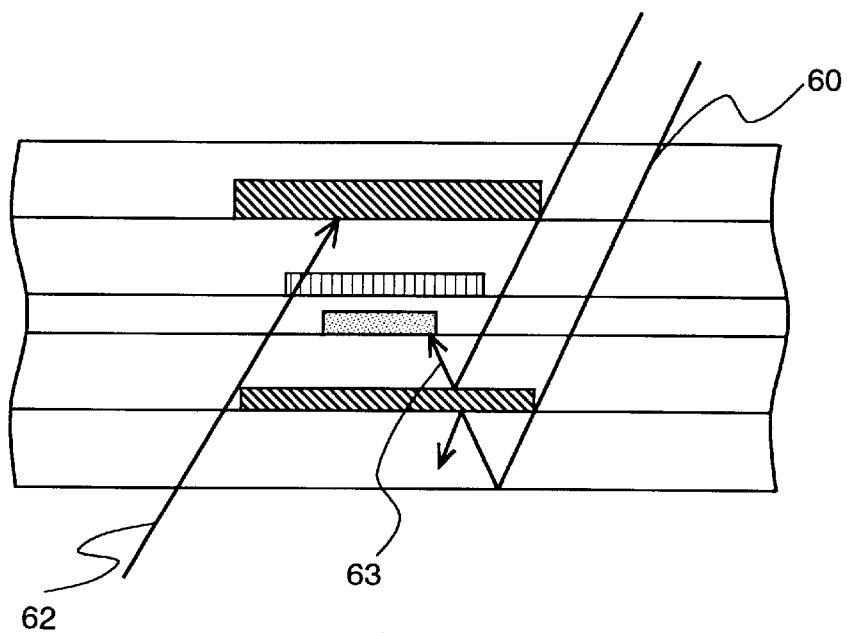

FIG. 3($a$) shows a partial cross-sectional view of the section around a TFT in an active matrix type LCD device. FIG. 3($b$) is a partial cross-sectional view taken on line A–A' of FIG. 3($a$). In this device, top-gate type TFTs, each of which is to serve as a switching element for one of pixels, are formed in arrays on a transparent insulating substrate 1 of glass or the like. This TFT substrate, an opposite substrate 13 on which an opposite electrode is formed and a liquid crystal 12 sealed between those two substrates constitute the LCD device.

Each layer formed on the TFT substrate is described below.

The TFT itself comprises a p-Si layer from which a source 4, a channel 5 and a drain 6 are formed, another p-Si layer to serve as a gate electrode 8 and a gate oxide film 7 lying between these layers. Between the TFT and the transparent insulating substrate 1, a first light-shielding film 2 is laid so as to prevent the reflected light from the side of said substrate to enter into the TFT. Between the first light-shielding film 2 and the TFT, a grounding oxide film 3 made of $SiO_2$ is laid. Further, over a p-Si layer of the gate electrode 8 and a gate oxide film 7, a second interlayer film 9 made of SiN is laid. The second interlayer film 9 is formed to sandwich, in a region not shown in the drawing, a metal wiring layer that is to serve as a scanning signal line (a gate line) connected with a gate. On the second interlayer film 9, there is laid a second light-shielding film 10 made of Al, which is to function also as a data signal line. The second light-shielding film 10 becomes a light-shielding layer against the incident light from the side of the liquid crystal layer 12. The second light-shielding film 10 is set in the direction perpendicular to the scanning signal line (the gate line) and is connected to the source 4 via a contact hole formed through the second interlayer film 9 and the gate oxide film 7. Further, over the second light-shielding film 10 and the second interlayer film 9, a third interlayer film 11 is formed for planarization. In a region omitted from the drawing, a contact hole connected to the drain 6 is formed through the third interlayer film 11, the second interlayer film 9 and the gate oxide film 7. On the third interlayer film 11, there is formed an ITO (Indium Tin Oxide) film being patterned into the shape of every pixel electrode, one part of which is to function as a pixel electrode herein by making connection with the drain 6 through this contact hole.

Next, a manufacturing method of these layers is described.

First, a first light-shielding film 2 is formed on a transparent insulating substrate 1 of glass or the like. For the first light-shielding film 2, tungsten silicide is utilized. In addition to that, chromium or the like can be used for the first light-shielding film 2. Tungsten silicide has a stable nature under the thermal step performed in a later stage for the TFT formation as well as a good light-shielding capability, sufficient even with a film thickness of 0.1 $\mu$m or so. In the present example, the film thickness thereof is set to be 0.175 $\mu$m. The first light-shielding film 2 is grown by the sputtering method or the CVD (Chemical Vapour Deposition) method and, then, an edge of the first light-shielding film 2 is worked into the form of a taper. In order to work a silicide film into the form, of a taper, a method in which photolithography is applied thereto and thereafter plasma etching is performed using a mixed gas of $SF_6+C_2Cl_2F_4$, $Cl_2+N_2+AlCl_3$ or the like is known. At this, a lateral face of the first light-shielding film 2 is worked into the shape of a taper in order that the incident light travelled behind the edge section of the second light-shielding film from the side of the liquid crystal layer 12 in an oblique way may be reflected towards the outer side of the TFT.

An end point 2$b$ of the lower side of the first light-shielding film 2 is required to be set at a such a position as an angle $\theta_1$ made between the direction normal at a channel end point 5a of the channel in the TFT and the line connecting the channel end point 5a and the end point 2b of the lower side is 50° or larger. In the present example, a distance from the foot of the perpendicular from the channel end point 5a of the channel 5 in the TFT to the end point 2b of the lower side of the first light-shielding film is set to be 1.5 μm. Further, in working into the shape of a taper, a taper angle $\theta_3$ is made to become 30°.

Over the first light-shielding film 2, a first interlayer film 3 is formed. As this film, a $SiO_2$ film is grown by the CVD method, for example. With respect to the film thickness of the first interlayer film 3, it is necessary to make thick enough to be able to protect the TFT from the electrical effects of the impurities of the metal or the like that are diffused out from the underlying glass substrate as steps of manufacturing the TFT proceed. Because of this, for example, it is set to be 1 μm.

On this first interlayer film 3, a TFT is formed. First, a boron-doped amorphous silicon layer is grown to a thickness of 0.075 μm by the LPCVD (Low Pressure CVD) method and thereafter laser annealing is applied thereto and, then, by performing steps of photolithography and etching, a p-Si layer is formed. Over this p-Si layer, a gate oxide film 7 is grown to a thickness of 0.1 μm by the CVD method. Further, a second p-Si layer is grown by the CVD method and then patterned into the form of a gate electrode 8. Subsequently, a source 4 and a drain 6 are formed by implanting phosphorus ions in the case of the N-type MOS (Metal-Oxide-Semiconductor)-TFT and boron in the case of the P-type MOS-TFT by means of ion implantation, and thereafter annealing for activation of the dopants is performed.

After the fabrication of the TFT, a first insulating film made of SiN is formed to a thickness of 0.4 μm by the CVD method. Etching is applied thereto and a contact hole connecting to the gate electrode is formed. Trough this, a metal wiring layer that is to be formed on the second interlayer film 9 but not shown in the drawing makes connection with the gate. The metal wiring layer is formed by sputtering Al. Over this metal wiring layer and the first insulating film, a SiN film is further formed to a thickness of another 0.4 μm, which makes up the second interlayer film 9.

On the second interlayer film 9, a second light-shielding film 10 is formed. This film is grown by sputtering Al and patterned into the form of a data line. At this, the width of the second light-shielding film 10 in the region where the channel region of one TFT is projected is designed in such a way that an angle $\theta_2$ made between the direction normal at an end point 10a of the second light-shielding film 10 and the line connecting the end point 10a and a taper starting point 2a of the first light-shielding film 2 becomes 30° or larger. In the present example, taking the accuracy of the stepper into consideration, the distance from the taper starting point 2a of the first light-shielding film 2 to the end point 10a of the second light-shielding film 10 is set to be 0.8 μm. This second light-shielding film 10 makes connection with the source 4 through a contact hole formed in the second interlayer film 9.

Further, over the second light-shielding film 10 and the second interlayer film 9, a third interlayer film 11 is coated to a thickness of 0.8 μm for planarization. By carrying out the step of etching, a contact hole connecting to the drain 6 is formed through the third interlayer film 11, the second interlayer film 9 and the gate oxide film 7. Finally, an ITO film is grown by the sputtering method and patterned into the shape of every pixel electrode.

Subsequently, a liquid crystal layer 12 and an opposite substrate 13 are formed and thereby a LCD device is accomplished.

What is claimed is:

1. A liquid crystal display device having, on a transparent insulating substrate, a first light-shielding film, a first interlayer film, a thin film transistor, a second interlayer film and a second light-shielding film, in this order; wherein:

said first light-shielding film is, with a taper-shaped end, in the form of trapezoid, in which the upper side on the side of the thin film transistor is shorter than the lower side on the side of the substrate, and an angle made between the line connecting an end point of said lower side and an end point of a channel in the thin film transistor and the direction normal at said end point of the channel is equal to or more than 50°; and, in addition, an angle made between the line connecting an end point of the lower face of said second light-shielding film and a taper starting point of the upper side of said first light-shielding film and the direction normal at said end point of the lower face of the second light-shielding film is equal to or more than 30°.

2. The liquid crystal display device according to claim 1, wherein a taper angle of the end section of said first light-shielding film is 30 to 80°.

3. The liquid crystal display device according to claim 1, wherein said first light-shielding film is formed from silicide.

4. The liquid crystal display device according to claim 3, wherein the taper section of said first light-shielding film is formed by plasma etching using a mixed gas of $SF_6$+ $C_2Cl_2F_4$ or $Cl_2+N_2+AlCl_3$.

5. The liquid crystal display device according to claim 2, wherein said first light-shielding film is formed from silicide.

6. The liquid crystal display device according to claim 5, wherein the taper section of said first light-shielding film is formed by plasma etching using a mixed gas of $SF_6$+ $C_2Cl_2F_4$ or $Cl_2+N_2+AlCl_3$.

7. The liquid crystal display device according to claim 1, wherein said second light-shielding film additionally serves as a data line.

8. The liquid crystal display device according to claim 2, wherein said second light-shielding film additionally serves as a data line.

9. The liquid crystal display device according to claim 3, wherein said second light-shielding film additionally serves as a data line.

10. The liquid crystal display device according to claim 4, wherein said second light-shielding film additionally serves as a data line.

11. The liquid crystal display device according to claim 5, wherein said second light-shielding film additionally serves as a data line.

12. The liquid crystal display device according to claim 6, wherein said second light-shielding film additionally serves as a data line.

* * * * *